(No Model.)
C. S. BEEBE.
TWO WHEELED VEHICLE.
No. 342,996. Patented June 1, 1886.
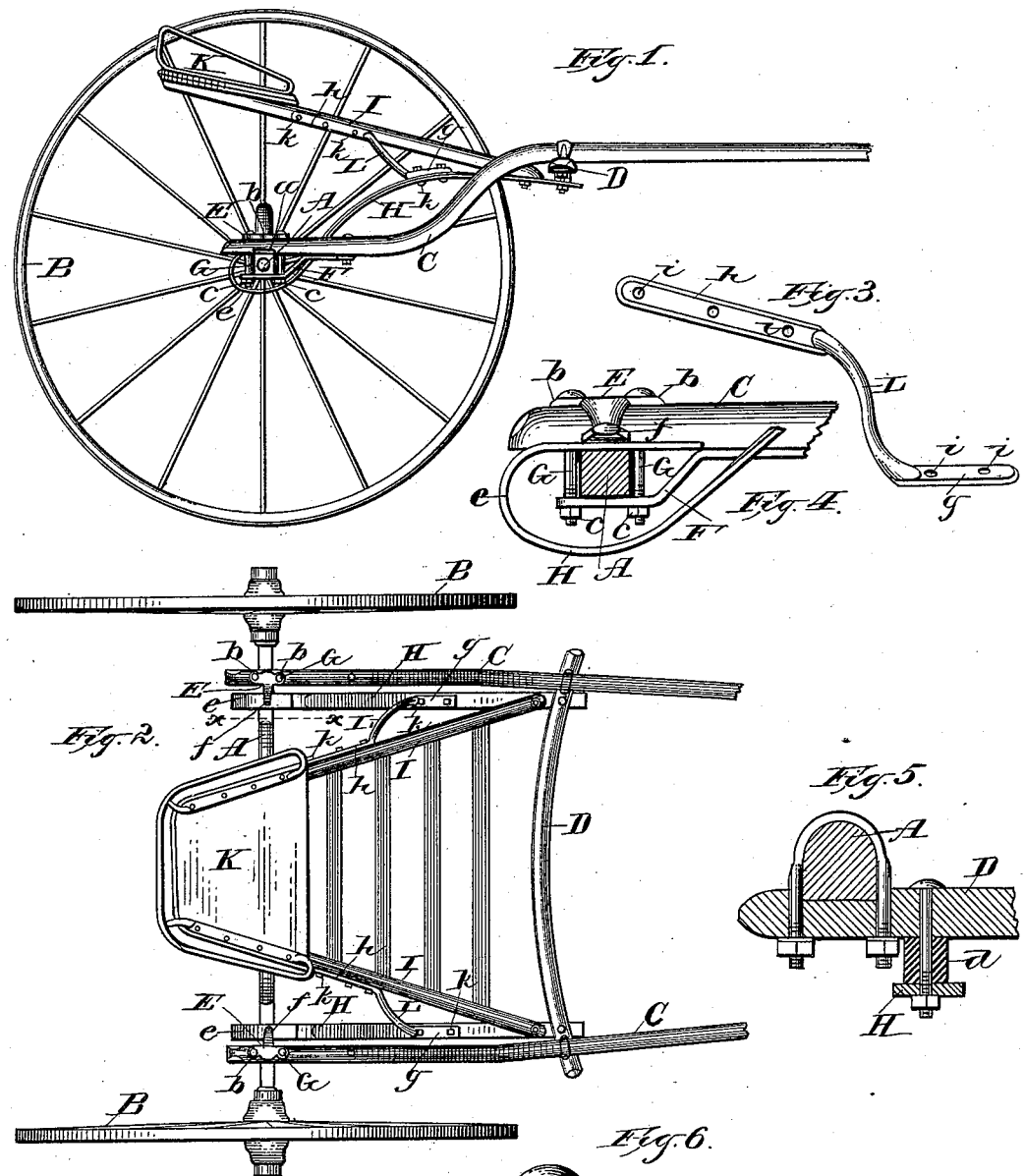

UNITED STATES PATENT OFFICE.

CHARLES S. BEEBE, OF RACINE, WISCONSIN.

TWO-WHEELED VEHICLE.

SPECIFICATION forming part of Letters Patent No. 342,996, dated June 1, 1886.

Application filed March 10, 1886. Serial No. 194,674. (No model.)

*To all whom it may concern:*

Be it known that I, CHARLES S. BEEBE, of Racine, in the county of Racine, and in the State of Wisconsin, have invented certain new and useful Improvements in Two-Wheel Vehicles; and I do hereby declare that the following is a full, clear, and exact description thereof.

My invention relates to that class of two-wheeled vehicles commonly denominated as "road-carts," and has for its objects to improve the same, whereby I am enabled to get the required height for the seat, and at the same time vary the width of the latter to suit individual tastes, while by a peculiar arrangement of the springs I give perfect freedom to their action, prevent rattling, and render the vehicle easy to mount from the rear. These objects I attain by the construction substantially as shown in the accompanying drawings and hereinafter described.

Figure 1 represents a side elevation of my vehicle with one wheel removed; Fig. 2, a top plan view of the same with both wheels in place; Fig. 3, a detail perspective view of a seat-bar brace; Fig. 4, a detail sectional view on line $x$ $x$, Fig. 2; Fig. 5, a similar view showing the manner of connecting the forward ends of the springs to the circle-bar; and Fig. 6, a detail end view illustrating the relative arrangement of the axle, a shaft, spring, and angle-iron.

Referring by letter to the drawings, A represents the axle for the wheels B of my vehicle, and C the shafts, that are rigidly secured to said axle and to a cross-bar, D. The shafts C, near their rear ends, are fitted in angle-irons E, that have their bases $a$ interposed between said shafts and the axle A. The heads of the angle-irons come over the upper faces of the shafts, and are provided with perforated enlargements $b$. Passed through the perforated enlargements of the angle-irons, the shafts, and angular straps F, secured upon the under faces of said shafts, are bolts or rivets G, that come on each side of the axle, and have their lower screw-threaded ends provided with nuts $c$, that serve to firmly retain the above-enumerated parts in their relative arrangement.

Pivotally bolted at their front ends to the cross-bar D are springs H, a cushion, $d$, of rubber or other elastic material being usually interposed between said bar and springs. The rear ends, $e$, of the springs are turned up and carried back toward the front of the vehicle, so as to come over and rest upon the top of the axle A, against which latter said spring ends are held by the impinging fingers $f$ of the angle-irons E, that are fitted to the shafts C, this construction and arrangement of parts being fully illustrated in detail, Figs. 4 and 6. The bars I, that support the seat K, are pivotally connected at their forward ends to the springs H, and thus by the rear ends of said bars being brought to or from each other I am enabled to secure a ready adjustment for various widths of seats.

To secure the required height for the seat K, I employ angular brace-irons L, that have their ends $g$ $h$ respectively secured to the springs H and pivoted bars I, these irons being made of various lengths, accordingly as said seat may be wide or narrow. These brace-irons L are preferably flattened at their ends and provided with perforations $i$ for the securing bolts $k$, that bind them to the springs and seat-bars, the central portion of said brace-irons being usually rounded and of such length and curve as to secure the desired elevation of the seat. The lower ends, $g$, of the brace-irons are on the same horizontal plane as that of the springs H, while the upper ends, $h$, are at an acute angle to such plane, one of said irons being illustrated in detail, Fig. 3. The fingers $f$ of the angle-irons E serve to prevent vertical displacement of the springs, but in no way limit their longitudinal movement, and as weight comes on and off said springs their rear ends are free to slide forward and back upon the axle and sidewise under the projecting fingers of said angle-irons. The heavier the weight on the seat the tighter the springs are pressed sidewise on the axle against the angle-irons fitted to the shafts, for the reason that said springs are pivoted at their front ends, and the brace-irons act to crowd their free ends outward in a direction toward the wheels of the vehicle, thereby doing away with the objectionable rattle that is common in road-carts of the ordinary construction, while at the same time the vehicle is rendered easy and safe to mount from the rear.

Having thus fully described my invention, what I claim as new, and desire to secure by Letters Patent, is—

1. In a two-wheel vehicle, the springs thereof pivotally secured at their front ends to the cross-bar and their rear ends loosely connected to the axle and having a free longitudinal and lateral movement thereon, as set forth.

2. In a two-wheel vehicle, the springs thereof pivotally connected at their front ends to the cross-bar and their rear ends turned up and carried back toward the front of said vehicle, whereby they come over and rest upon the axle, as set forth.

3. In a two-wheel vehicle, the springs thereof pivotally connected at their front ends to the cross-bar and their rear ends turned up and carried back toward the front of said vehicle, whereby they come over and rest upon the axle, in combination with angle-irons secured to the shafts and adapted to impinge against said rear ends of the springs, as set forth.

4. In a two-wheel vehicle, the seat-bars thereof supported at the required elevation by angular brace irons having their ends respectively secured to said bars and the springs, as set forth.

5. In a two-wheel vehicle, the seat-bars thereof pivotally connected at their forward ends to the springs and supported by brace-irons that are rigidly connected to said bar and springs, as set forth.

6. In a two-wheel vehicle provided with angular brace-irons designed to connect the springs and seat-bars, whereby the latter are held at the desired elevation, each of said angle-irons having its lower end on the same horizontal plane as the spring, to which it may be secured, and the upper end at an acute angle to said plane, as set forth.

7. In a two-wheel vehicle, an angle-iron adapted to be fitted to a shaft and provided with a projecting finger designed to come over an adjacent spring, whereby the latter is prevented from vertical displacement, as set forth.

8. In a two-wheel vehicle, an angle-iron adapted to be fitted to a shaft, with its base interposed between the latter and the axle and provided with a projecting finger designed to impinge against an adjacent spring, in combination with an angular strap secured to the under face of the shaft and suitable bolts adapted to pass through the heads of the angle-iron, the shaft, and angular strap, whereby the several parts are secured in position with relation to said axle, as set forth.

In testimony that I claim the foregoing I have hereunto set my hand, at Racine, in the county of Racine and State of Wisconsin, in the presence of two witnesses.

CHARLES S. BEEBE.

Witnesses:
BYRON B. BLAKE,
CHARLES SHAW.